(12) United States Patent
Tutmark

(10) Patent No.: US 8,968,422 B2
(45) Date of Patent: Mar. 3, 2015

(54) SYSTEMS AND METHODS FOR APPLYING MARKINGS TO AN ARTICLE

(75) Inventor: Bradley C. Tutmark, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 161 days.

(21) Appl. No.: 12/691,171

(22) Filed: Jan. 21, 2010

(65) Prior Publication Data

US 2011/0173762 A1 Jul. 21, 2011

(51) Int. Cl.
*D06P 5/24* (2006.01)
*B41K 1/42* (2006.01)
*D06P 1/00* (2006.01)
*C09D 11/03* (2014.01)

(52) U.S. Cl.
CPC .............. *D06P 1/0004* (2013.01); *C09D 11/03* (2013.01); *D06P 1/0016* (2013.01); *D06P 5/003* (2013.01)
USPC ................................... 8/506; 8/445; 101/333

(58) Field of Classification Search
USPC ...................................... 8/506, 445
See application file for complete search history.

(56) References Cited

U.S. PATENT DOCUMENTS

| | | | |
|---|---|---|---|
| 4,668,239 A | 5/1987 | Durand | |
| 5,942,464 A * | 8/1999 | Vaughn et al. | 503/200 |
| 6,004,900 A | 12/1999 | O'Brien, III | |
| 6,035,777 A | 3/2000 | King | |
| 6,358,160 B1 * | 3/2002 | Winskowicz | 473/378 |
| 6,732,649 B1 * | 5/2004 | Wall et al. | 101/401.1 |
| 6,733,543 B2 | 5/2004 | Pyles et al. | |
| 6,742,449 B2 | 6/2004 | Sosin | |
| 6,893,360 B2 | 5/2005 | Brown | |
| 6,935,240 B2 * | 8/2005 | Gosetti | 101/491 |
| 7,220,192 B2 | 5/2007 | Andre et al. | |
| 7,283,657 B1 | 10/2007 | Carlson | |
| 2002/0039928 A1 | 4/2002 | Spurgeon et al. | |
| 2007/0001345 A1 | 1/2007 | Piermatteo et al. | |
| 2007/0209536 A1 * | 9/2007 | Daivari | 101/333 |
| 2007/0256255 A1 | 11/2007 | Witman et al. | |

(Continued)

FOREIGN PATENT DOCUMENTS

CN 202047292 U 11/2011
CN ZL201120020302.7 11/2011

(Continued)

OTHER PUBLICATIONS

Extended European Search Report dated Jul. 22, 2011 in European Patent Application No. EP 11 15 1333.

(Continued)

*Primary Examiner* — Harold Pyon
*Assistant Examiner* — Katie L Hammer
(74) *Attorney, Agent, or Firm* — Plumsea Law Group, LLC

(57) ABSTRACT

Systems and methods for applying markings to an article are disclosed. One aspect comprises providing a dye pad shaped to correspond to a desired marking; applying an infusion dye to the dye pad; applying an activation solution to the infusion dye, thereby forming an infusion dye mixture; placing the dye pad in contact with a discrete area of an outer surface of the article; leaving the dye pad in contact with the outer surface of the article under room temperature and pressure, for a duration sufficient to allow the infusion dye mixture to open a polymeric structure of a material of the outer surface and to allow the infusion dye to penetrate the outer surface and form the desired marking within a substrate of the article; and removing the dye pad from the outer surface. An infusion dyeing kit and method for supplying a kit are also disclosed.

26 Claims, 6 Drawing Sheets

(56) References Cited

U.S. PATENT DOCUMENTS

| | | | |
|---|---|---|---|
| 2008/0098536 A1 | 5/2008 | Bracken et al. | |
| 2008/0105145 A1* | 5/2008 | Schaafsma et al. | 101/41 |
| 2008/0299324 A1 | 12/2008 | Naisby et al. | |
| 2009/0089942 A1 | 4/2009 | Pyles et al. | |

FOREIGN PATENT DOCUMENTS

| | | |
|---|---|---|
| CN | ZL201110024208.3 | 4/2014 |
| EP | 2365125 | 3/2013 |
| GB | 16079 | 0/1912 |
| JP | 6-26923 | 4/1994 |
| JP | 7-89047 | 4/1995 |
| JP | 2000-254251 | 9/2000 |
| JP | 2002-526182 | 8/2002 |
| JP | 5325901 | 7/2013 |
| TW | 511585 | 11/2002 |
| TW | 517649 | 1/2003 |
| TW | I432241 | 4/2014 |
| WO | 0020219 A1 | 4/2000 |
| WO | 0021014 A2 | 4/2000 |
| WO | 0021014 A3 | 4/2000 |
| WO | 0177212 | 10/2001 |

OTHER PUBLICATIONS

Official Letter, Search Report, and English Translation of Search Report, issued Apr. 11, 2013 for Taiwanese Patent Application No. 100100298.
Office Action issued Mar. 5, 2013 for Japanese Patent Application No. 2011-004003 and English translation thereof.
Response to Second Office Action filed in Chinese Invention Patent Application No. 201110024208.3 on May 27, 2013, and English translation thereof.
Response to Office Action filed Jun. 5, 2013 in Japanese Patent Application No. 2011-004003 and English translation thereof.
Decision to Grant issued Jun. 25, 2013 in Japanese Patent Application No. 2011-004003 and English translation thereof.
Notification of First Office Action in Chinese Utility Application No. 201110024208.3, mailed on Jul. 24, 2012 and English translation thereof.
Notification of Grant of Patent Right for Utility Model for Chinese Utility Model Patent Application No. 201120020302.7, issued on Jul. 11, 2011, and English translation thereof.
Response to Official Communication dated Sep. 9, 2011 for European Patent Application No. 11151333.9, as filed on Mar. 5, 2012.
Communication under Rule 71(3) EPC dated Aug. 14, 2012 for European Patent Application No. 11151333.9.
Notification of Second Office Action in Chinese Invention Patent Application No. 201110024208.3, issued on Apr. 1, 2013, and English translation thereof.
Office Action in Japanese Patent Application No. 2011-004003, dated Mar. 5, 2013, and English translation thereof.
Observation to the First Office Action for Chinese Invention Patent Application No. 201110024208.3, submitted on Dec. 6, 2012, and English translation thereof.
Response to Official Letter filed Oct. 15, 2013 in Taiwanese Patent Application No. 100100298 and English translation amended claims.
Notice of Allowance dated Jan. 28, 2014 in Taiwanese Patent Application No. 100100298 and English translation thereof.
Response to First Office Action filed Dec. 6, 2012 in Chinese Invention Patent Application No. 201110024208.3 and English translation thereof.
Notice of Allowance dated Feb. 10, 2014 in Chinese Invention Patent Application No. 201110024208.3 and English translation thereof.
Japanese Translation of PCT International Application Publication No. 2002-526182 with English Abstract thereof.

* cited by examiner

SYSTEMS AND METHODS FOR APPLYING MARKINGS TO AN ARTICLE

BACKGROUND

The present invention relates to systems and methods for applying markings to an article, and more particularly, to systems and methods for applying marks, symbols, labels, graphics, indicia, logos, numbers, and other markings to a manufactured article, such as a golf ball.

Product designers and manufacturers often desire to mark manufactured articles, such as golf balls, with marks, symbols, labels, graphics, indicia, logos, numbers, or other markings. With golf balls, conventional methods have included pad printing, ink-jet printing, and other methods of depositing ink on top of the ball surface. With these conventional methods, because the markings are applied as a layer on top of the ball surface, the markings are susceptible to wear during use. In addition, because the markings are applied on top of the outer ball surface, the rate of wear may be faster than the outer ball surface itself.

To improve the wear characteristics of the markings, sublimation printing processes have been developed, which sublimate ink into the surface of an article using heat and pressure. The heat and pressure are required to convert the solid dye particles to a gaseous or vapor state, so that the dispersed vapor dye penetrates and adheres to the surface of the article.

One example of sublimation printing is disclosed in U.S. Pat. No. 6,935,240 to Gosetti, which forms indicia on a golf ball by applying heat and pressure to diffuse sublimating ink into the surface of a component. The specification defines sublimation as the conversion of a solid dye particle to a gaseous or vapor state.

Another example of a sublimation process is disclosed in U.S. Pat. No. 6,004,900 to O'Brien, which is directed to sublimation dyeing of articles formed of composite materials. O'Brien discloses a composite article having an outermost ply of fibers embedded in a composite mixture having a certain amount of optically light pigment and a visually distinct sublimation print applied thereon. The O'Brien process applies a sublimation print to the outermost surface of an optically light fiber-resin composite material to form indicia. Like Gosetti, O'Brien discloses the transfer of the sublimation dye to the composite outer surface by heat and pressure.

In addition to sublimation, another manufacturing process for applying ink within a surface of a plastic article is what is generally referred to as infusion dyeing. Typically, with infusion dyeing, a plastic article is immersed in a dye solution and the dye penetrates the surface of the plastic, thereby residing among the plastic molecules rather than being a surface coating. The infused dye color therefore may not be easily rubbed off. This dyeing method was developed to apply color to plastic parts without having to add colorant to the plastic raw material during the molding or fabrication process, thereby allowing customizable or small batch coloring at reduced manufacturing costs. The amount of color effect may be controlled by the amount of time spent in the dye solution.

An example of infusion dyeing is disclosed in U.S. Publication No. 2007/0256255 to Witman, which is generally directed to the coloring of a coated article. A superstrate is fixedly joined to at least a portion of the substrate of the article, to produce a coated article. In a subsequent step, a coloring dye-containing material system is applied to the coated article under conditions that infuse coloring dye into the superstrate. In particular, a polymeric coating (superstrate) is first applied to an object and then a superstrate is brought into contact with a material system that contains (i) water, (ii) a carrier, (iii) a dye, and (iv) a diol, under conditions that diffuse the dye into the superstrate. Witman discloses immersion techniques for bringing the superstrate in contact with the aqueous dye material system that include dipping, spraying, and flow coating.

Other examples of infusion dyeing are disclosed in U.S. Publication No. 2009/0089942 to Pyles et al. and U.S. Pat. No. 6,733,543 to Pyles et al., which disclose methods of tinting a plastic article. The disclosed infusion dye application methods involve immersing the plastic article, such as by dipping, spraying, curtaining (running part through a waterfall curtain of dye), flow coating, spin applying, and immersion dyeing.

The conventional methods for marking articles, such as sublimation ink processes and infusion dyeing, may be incorporated into the overall manufacturing process, to produce a final product. However, these techniques typically require extensive equipment and manufacturing conditions that cannot be conveniently provided in a post-manufacture setting. Sublimation ink processes require the application of considerable heat and pressure, which a final product often cannot withstand and which is beyond the capabilities of end users. Likewise, conventional infusion dyeing processes require specialized equipment to accommodate full-immersion application methods such as dipping, spraying, curtaining, flow coating, spin applying, and immersion dyeing.

These conventional methods are therefore unsuitable for post-manufacture marking of articles. Manufacturers often desire to give consumers the ability to customize manufactured articles during or after purchase, by enabling consumers to mark or otherwise personalize the manufactured articles. For example, consumers of golf balls often desire to personalize the golf balls with company names and logos. And, typically, the desired number of personalized golf balls does not justify large-scale manufacturing efforts. Therefore, there remains a need for systems and methods for applying markings to articles in low-volume, post-manufacture settings.

SUMMARY

Embodiments provide systems and methods for applying markings to an article using infusion dye selectively applied to the surface of a plastic part such as a golf ball. This selectively applied infusion dye is incorporated into the surface of the article, providing a wear resistant marking that wears off at the same rate as the plastic surface or coating into which the marking is infused.

One aspect provides a method for marking a manufactured article with a desired marking, including providing a dye pad shaped to correspond to the desired marking; applying an infusion dye to the dye pad; applying an activation solution to the infusion dye, thereby forming an infusion dye mixture; placing the dye pad in contact with a discrete area of an outer surface of the manufactured article; leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and removing the dye pad from the outer surface.

In another aspect, the activation solution may comprise one of water and alcohol.

In another aspect, applying the activation solution to the infusion dye may comprise storing the activation solution in the dye pad separated from the infusion dye by a breakable barrier, and breaking the barrier.

In another aspect, storing the activation solution may comprise storing the activation solution in a breakable capsule.

In another aspect, storing the activation solution may comprise containing the activation solution behind an impermeable breakable layer.

In another aspect, the manufactured article may comprise a golf ball.

In another aspect, an end user may complete the applying the activation solution to the infusion dye, the placing the dye pad in contact with the outer surface, the leaving the dye pad in contact with the outer surface, and the removing the dye pad.

In another aspect, providing a dye pad shaped to correspond to the desired marking may comprise displaying a plurality of selectable markings, receiving from a consumer a selection of the desired marking from among the plurality of selectable markings, and forming the dye pad to be shaped according to the desired marking.

In another aspect, providing a dye pad shaped to correspond to the desired marking may comprise enabling a consumer to create a custom marking to be the desired marking, and forming the dye pad to be shaped according to the custom marking.

In another aspect, providing a dye pad shaped to correspond to the desired marking may comprise receiving from an end user an identification of the article; determining, from the identification, surface features of the article; and forming complementary features on a contact surface of the dye pad that correspond to the surface features of the article.

In another aspect, the article may comprise a golf ball, the identification may comprise a manufacturer and a model associated with the golf ball, and the surface features may comprise a dimple pattern associated with the manufacturer and the model of the golf ball.

In another aspect, the method further may comprise forming surface features in a contact surface of the dye pad, wherein the surface features are configured to mate with corresponding surface features on the outer surface of the article contacted by the dye pad.

In another aspect, placing the dye pad in contact with a discrete area of an outer surface of the manufactured article may comprise providing a mold sized and shaped to receive the article with the dye pad pressed between the mold and the article.

Another aspect provides an infusion dyeing kit for marking a manufactured article with a desired marking, the kit comprising an infusion dye, and a dye pad shaped to correspond to the desired marking and to contact a discrete area of an outer surface of the manufactured article, wherein the dye pad is configured to absorb the infusion dye, and wherein the infusion dye is configured to be activated by an activation solution, under room temperature and pressure, that causes the infusion dye to penetrate a surface of the manufactured article with which the dye pad is placed in contact.

In another aspect, the activation solution may comprise one of water and alcohol.

In another aspect, the activation solution may be contained within the pad and separated from the infusion dye by a breakable barrier.

In another aspect, the breakable barrier may comprise a breakable capsule.

In another aspect, the dye pad may comprise an internal structure configured to puncture the breakable barrier when a force is applied to the dye pad.

In another aspect, an infusion dyeing kit may further comprise an impermeable backing on a first side of the dye pad and a removable cover on a second side of the dye pad opposite to the first side.

In another aspect, the dye pad may comprise a contact surface configured to contact the manufactured article and an outer surface opposite to the contact surface, and the kit may further comprise an adhesive layer over the outer surface, wherein the adhesive layer may be configured to adhere to the surface of the manufactured article and press the dye pad against the surface of the manufactured article.

In another aspect, the manufactured article may comprise a golf ball.

In another aspect, the dye pad may comprise a divider that separates a first portion of the dye pad from a second portion of the dye pad such that a first dye applied to the first portion does not mix with a second dye applied to the second portion.

In another aspect, the article may comprise a golf ball, and a surface of the dye pad that contacts the surface of the golf ball may comprise projections configured to mate with corresponding dimples of the golf ball.

In another aspect, the infusion dyeing kit may further comprise a mold that matches a shape of the manufactured article, wherein the infusion dyeing kit is configured to press the dye pad between the mold and the article.

In another aspect, the manufactured article may comprise a golf ball, and the dye pad may be curved to match an overall surface curvature of the golf ball.

In another aspect, a surface of the dye pad to be placed in contact with the manufactured article may be pre-marked with suggested colors and designs.

Another aspect provides a method for supplying an infusion dyeing kit for marking a golf ball with a desired marking. The method may comprise receiving from a consumer an indication of the desired marking and an identification of the golf ball to be marked; forming a dye pad according to the desired marking and the identification of the golf ball to be marked; providing the consumer with the dye pad, an infusion dye, and an activation solution; and providing the consumer with instructions for mixing the infusion dye and the activation solution into an infusion dye mixture on the dye pad and applying the dye pad to the golf ball.

In another aspect, providing the consumer with the dye pad, the infusion dye, and the activation solution may comprise impregnating the dye pad with one of the infusion dye and the activation solution and containing the other of the infusion dye and the activation solution behind a breakable barrier, and wherein the instructions explain how to break the breakable barrier.

In another aspect, receiving from the consumer the indication of the desired marking may comprise one of receiving a selection from among a plurality of selectable markings and receiving a custom marking designed by the consumer.

In another aspect, the identification of the golf ball may comprise a model of the golf ball, and forming the dye pad may comprise determining a dimple pattern of the model of the golf ball and forming a contact surface of the dye pad with projections that match the dimple pattern of the model of the golf ball.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Embodiments provide infusion dyeing systems and methods for selectively applying markings to an article. The selective application provides isolated or discrete markings within a larger surface of the article.

Figure 1:
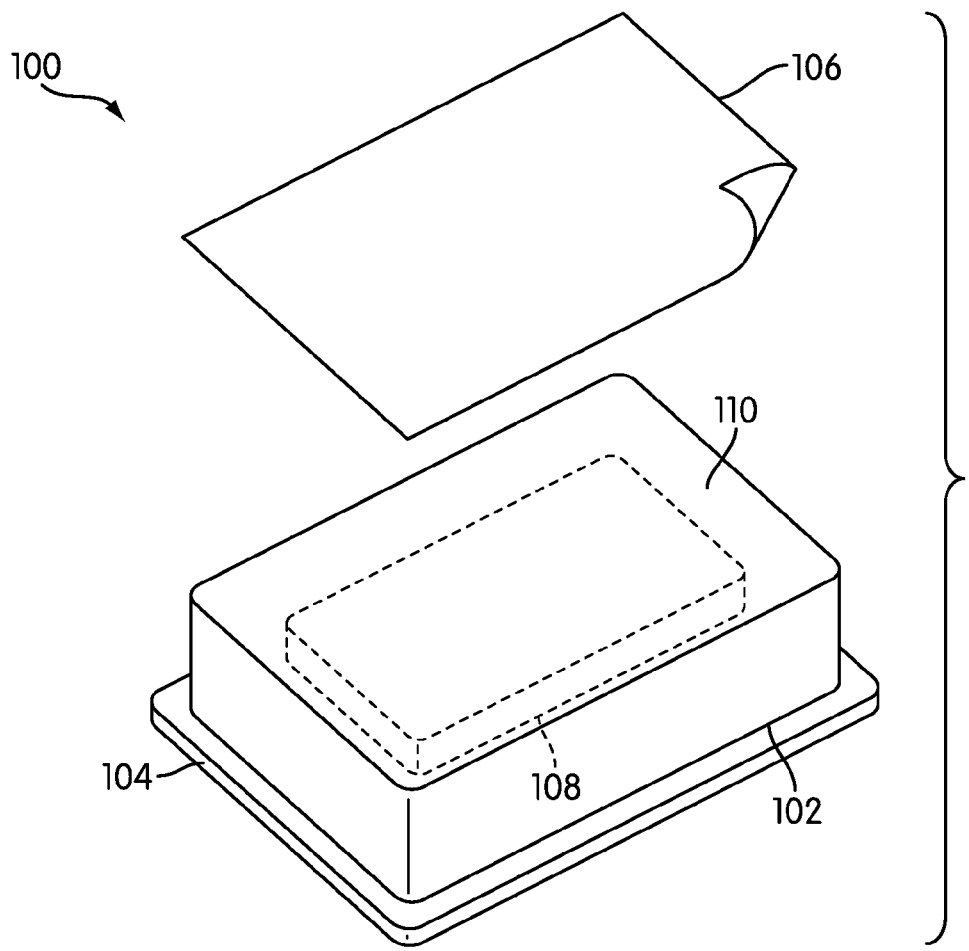
FIG. 1 is a schematic diagram of an isometric view of an exemplary embodiment of a system for applying markings to an article.

FIG. 1 is an isometric view of an exemplary embodiment of a system 100 for applying markings to an article. In one embodiment, system 100 may be in the form of a pad, such as a patch or tattoo pad. For clarity, the following detailed description discusses preferred embodiments; however, it should be kept in mind that the present invention could also assume other forms of applying a pad, such as using sheets, stamps, or rollers. Thus, notwithstanding the benefits of the particular pads discussed herein, the invention should be considered broadly applicable to any material and/or component capable of absorbing and/or delivering dye.

Figure 2:
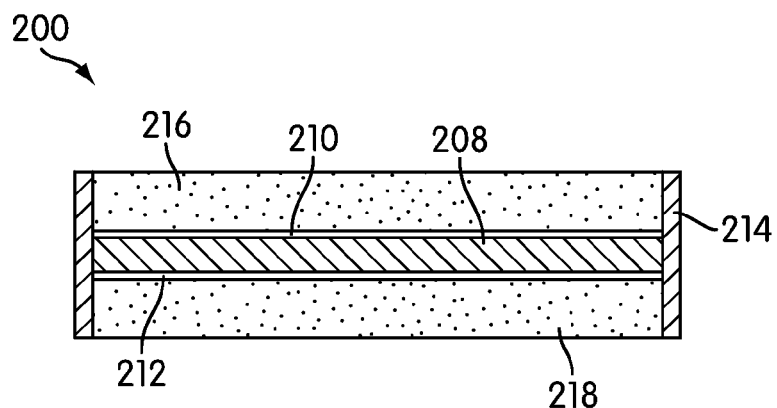
FIG. 2 is a schematic diagram of a cross-sectional view of an exemplary embodiment of a dye pad with a layered configuration.

As shown, system 100 may include a dye pad 102, a backing 104, and a removable cover 106. Dye pad 102 may be configured to absorb a dye suitable for an infusion dyeing process. Dye pad 102 may also include an activation solution 108, which before use of system 100, is preferably separated from the dye by a barrier. The barrier may be a breakable container, such as a capsule or a plurality of micro-capsules. The barrier may also comprise one or more surrounding layers of impermeable, but breakable, material, behind which the activation solution is contained. As an example, FIG. 2 illustrates a cross-sectional view of a dye pad 200 with a layered configuration, in which activation solution 208 is contained between an upper layer 210, a lower layer 212, and side panels 214. On the sides of upper layer 210 and lower layer 212 opposite to the activation solution 208, the dye pad 200 may include upper portion 216 and lower portion 218 impregnated with dye. Alternatively, instead of the two layers 210, 212 and two portions 216, 218 shown in FIG. 2, a dye pad may include a single impermeable layer separating an activation solution from a single portion of the dye pad impregnated with dye.

Separating the dye from the activation solution in the dye pad enables a marking application system to be manufactured, stored, packaged, and sold in a ready-to-use state. An end user may activate the infusion dye when desired, for example, when the dye pad is placed in contact with an article to which markings are to be applied. The end user activates the infusion dye by breaking the barrier separating the activation solution from the infusion dye. For example, in the case of activation solution contained in a capsule or microcapsules, or between layers, the end user may apply a force to the dye pad sufficient to break the barrier, such as by pressing, twisting, kneading, or folding.

In some embodiments, a marking application system may include provisions for puncturing the barrier. For example, a separate tool, such as a pick or knife, may be used to penetrate an outer portion of the dye pad impregnated with infusion dye and puncture a barrier within the pad. In such embodiments, the outer portions of a dye pad may be made of a material that may be easily penetrated and that then subsequently recovers substantially to its original form to close the puncture hole, and thereby contain the activation solution to allow the solution to diffuse throughout the pad. Suitable materials for the outer portions of the dye pad may include resilient materials such as memory foam (polyurethane), or self-healing materials such as self-healing polymers and fiber-reinforced polymer composites. In addition to external provisions for puncturing the barrier, a dye pad may also include internal provisions such as sharp structures within the pad that puncture the barrier when a particular force is applied to the pad. For example, the dye pad may include a flexible capsule in which a pointed triangular structure is contained, so that when the flexible capsule is squeezed it is punctured by a sharp corner of the triangular structure.

Optionally, instead of separating the activation solution from the infusion dye using a physical barrier, the activation solution may be interspersed throughout the pad with the infusion dye, but may not activate the infusion dye until exposed to air. In this case, the dye pad may be sealed until ready for use. During use, a cover may be removed to expose the dye pad to air and the pad may be placed in contact with an article to apply the desired marking.

In other embodiments, an activation solution may be applied to a dye pad at the time of use. For example, a pad impregnated with infusion dye may be provided with an activation solution stored in a separate container. When the application marking system is ready for use, the activation solution is applied to the dye pad and the dye pad is placed in contact with the article to be marked. The activation solution may be applied to the dye pad, for example, by brushing the activation solution onto the pad, by spraying the activation solution onto the pad, by blotting the activation solution onto the pad with another pad, foam brush, or swab, by dipping the pad into the activation solution, or by applying the activation solution to an area on the article to be marked and placing the dye pad in contact with that area.

Alternatively, application of the dye and activation solution to the pad may be reversed, whereby a pad first may be impregnated with an activation solution, with a dye then subsequently applied to the pad during use.

In other embodiments, an empty pad may be provided, with infusion dye and activation solution supplied in separate containers. During use, the infusion dye and activation solution may be applied to the pad. The pad containing activated infusion dye may then be placed in contact with the article to be marked.

Enabling the application of the infusion dye to a pad during use (as opposed to during manufacture) allows an end user to customize the appearance of a marking produced by the pad, for example, in terms of design and color. In one embodiment, a user may apply the dye freehand to the pad, choosing desired designs and colors. In another embodiment, a top surface of the pad may be pre-marked with suggested colors and designs, for example, using guidelines, outlines, and symbols. An end user may then apply different color dyes as indicated by the symbols and within the areas denoted by the guidelines and outlines. For the customizable dye pads, the infusion dyes may be provided in a wide variety of color choices, to accommodate individual needs and tastes.

Figure 3:
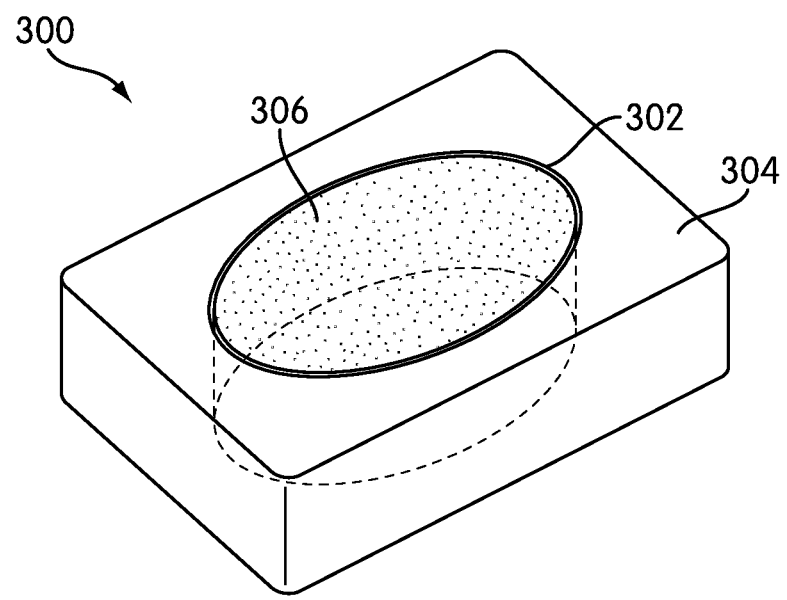
FIG. 3 is a schematic diagram of an isometric view of an exemplary embodiment of a pad capable of applying a two-color circular marking.

A marking application system may also include provisions for containing the manually applied infusion dye and/or activation solution within certain areas of a dye pad. For example, FIG. 3 illustrates an isometric view of a pad 300 capable of applying a two-color circular marking. The pad 300 may include an impermeable divider 302 that separates outer portion 304 of pad 300 from inner portion 306 of pad 300 and defines the circular marking. A user may apply a first colored dye in the inner portion 306 and a second differently colored dye in the outer portion 304. Divider 302 separates the differently colored dyes and avoids their mixing and causing unwanted color variations. Divider 302 may, of course, be shaped and positioned differently to provide other designs, and may include additional continuous or separate sections to further divide the pad 300 into additional portions to produce a desired marking. Dividers separating portions of a pad may be arranged to produce any desired marking, such as letters, numbers, logos, icons, and pictures, which a user may then color to his or her liking.

Figure 4:
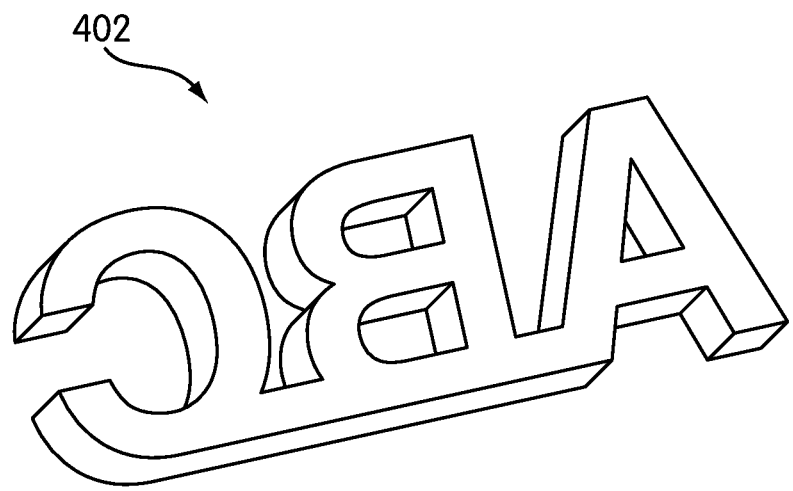
FIG. 4 is a schematic diagram of an isometric view of an exemplary embodiment of a dye pad shaped into a letter design.

In another embodiment, a dye pad may be formed into a desired marking. For example, the perimeter of a dye pad may be shaped to produce a desired marking. FIG. 4 illustrates an isometric view of an exemplary dye pad 402 shaped into a letter design, which in this case is an "ABC" letter design. In one aspect, a dye pad may be cut into the desired marking during manufacture. In another aspect, a dye may be provided in generic shapes, such as a rectangle, square, or circle, which the user may cut or punch into particular desired markings. For example, a die or punch tool configured in the shape of a letter or number may form a generically shaped dye pad into the desired letter or number. In another aspect, multiple separate dye pads, each shaped into designs, single-digit numbers, or letters, may be provided, which a user may arrange into desired designs, numbers, words, or combinations thereof.

Figure 5:
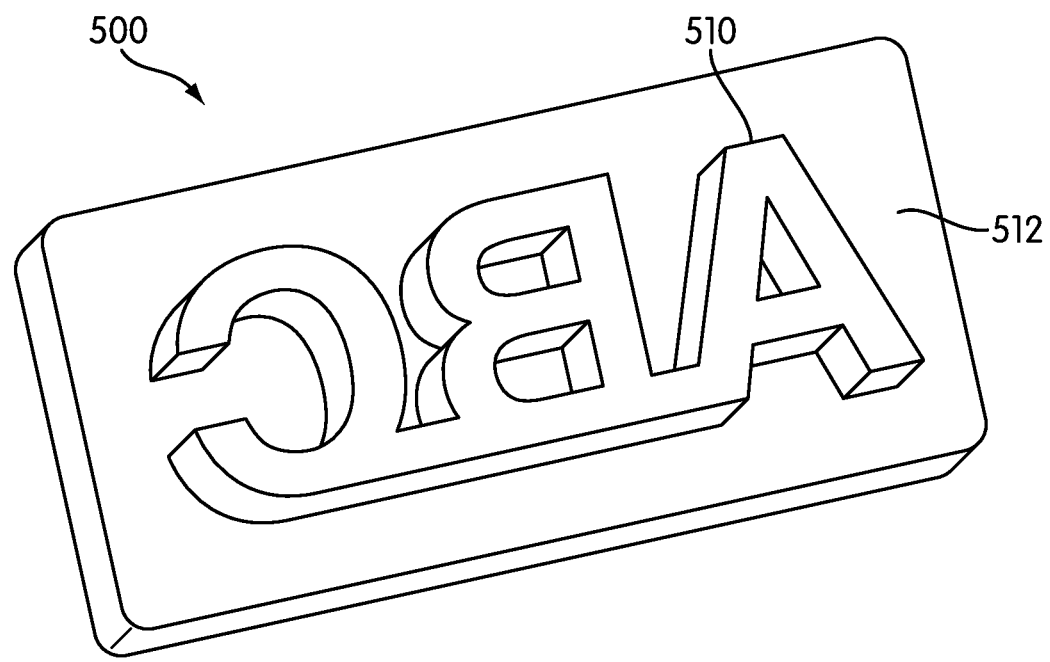
FIG. 5 is a schematic diagram of an isometric view of an exemplary embodiment of a dye pad having a raised portion and a recessed portion surrounding the raised portion.

Alternatively, instead of cutting the perimeter of the dye pad into the desired marking as shown in the dye pad 402 of FIG. 4, a dye pad may include raised or embossed portions that define a desired marking and are surrounded by recessed or lower portions of the dye pad. FIG. 5 illustrates an isometric view of an exemplary dye pad 500 according to this embodiment, having a raised portion 510 to provide the desired marking and a recessed portion 512 surrounding the raised portion 510. With this configuration, a user may conveniently apply dye to only the raised portion 510, without getting the dye on the recessed portion 512.

Referring again to FIG. 1, a marking application system 100 may also include provisions for protecting and handling a dye pad, and for aligning and positioning a dye pad on an article to be marked. As shown, system 100 may include a removable cover 106 that protects and seals the contact surface 110 of the dye pad 102 until ready for use. Cover 106 may avoid evaporation of the infusion dye or activation solution, and unintended markings of objects before the dye pad 102 is placed in contact with the article to be marked. Marking application system 100 may also include a backing 104, which may be fixedly attached to the dye pad 102, may seal the back face of the dye pad 102, and may provide a structure by which to hold the marking application system 100. To provide a suitable handle, backing 104 may be stiffer than the dye pad 102 and may extend beyond the perimeter of the dye pad 102 as shown in FIG. 1.

To enable even contact and alignment with the surface of the article to be marked, some embodiments may provide surface features on the contact surface 110 of the dye pad 102 that cooperate with respective surface features on the article to be marked. For example, corresponding projections and recesses may be provided on contact surface 110 of the dye pad 102 and the outer surface of the article to be marked, which may ensure that the two surfaces contact each other over the entire area over which the marking is desired so that the dye is applied to the article evenly and with as little variation in coverage and opaqueness as possible. The corresponding projections and recesses may also ensure that the dye pad 102 is properly aligned with the article to be marked so that the marking is applied at the desired location and alignment on the article.

Figure 6:
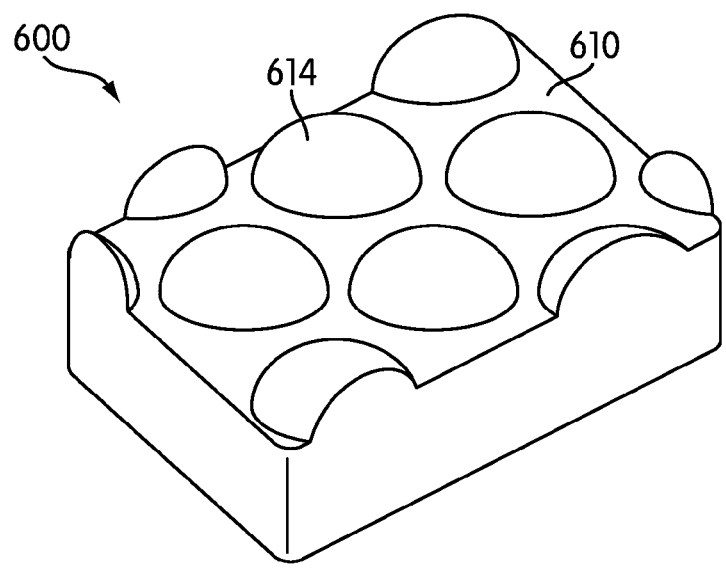
FIG. 6 is a schematic diagram of an isometric view of an exemplary embodiment of a dye pad having a contact surface with projections that may cooperate with complementary recesses in the outer surface of an article to be marked.

As an example, FIG. 6 illustrates an isometric view of a dye pad 600 having a contact surface 610 with projections 614 that may cooperate with complementary recesses in the outer surface of an article to be marked. For example, the projections 614 may be positioned within correspondingly shaped and positioned dimples of a golf ball to be marked, thereby ensuring even contact within and around the dimples. Although FIG. 6 shows the projections 614 on a simple rectangular pad 600, projections may be incorporated into a contact surface of a dye pad shaped into a particular design, such as the pad 402 of FIG. 4, to enable better contact with an article that has recesses corresponding to the projections, such as a golf ball.

In another embodiment, a dye pad itself is curved or otherwise shaped to match the contour of an article to be marked. In one implementation, a dye pad is pre-formed with a shape, a curvature, and projections that match the dimple pattern and overall surface curvature of a golf ball.

Shaping the dye pad to match the surface contours and features of the article may help facilitate an even contact, as described above, and may be sufficient to apply a marking to an article. However, in positioning a dye pad in contact with an article to be marked, it may be preferable that the dye pad be physically pressed evenly against the surface of the article to facilitate a consistent transfer of the dye into the surface of the article across the entire area of the marking. In one embodiment, the dye pad may be manually held in place and pressed by the end user. In another embodiment, application marking system 100 may include provisions for holding and pressing a dye pad onto the surface of an article. For example, after placing the dye pad in contact with the surface of the article, the article could be placed in a mold that matches the shape of the article, so that the dye pad is pressed between the mold and the article. The weight of the article or the weight of the mold (depending on which is placed on top) may provide enough force to keep the dye pad pressed evenly against the surface of the article. Clamps, vises, or other holding devices may also be used to press the dye pad against the surface of the article to be marked.

Figure 7:
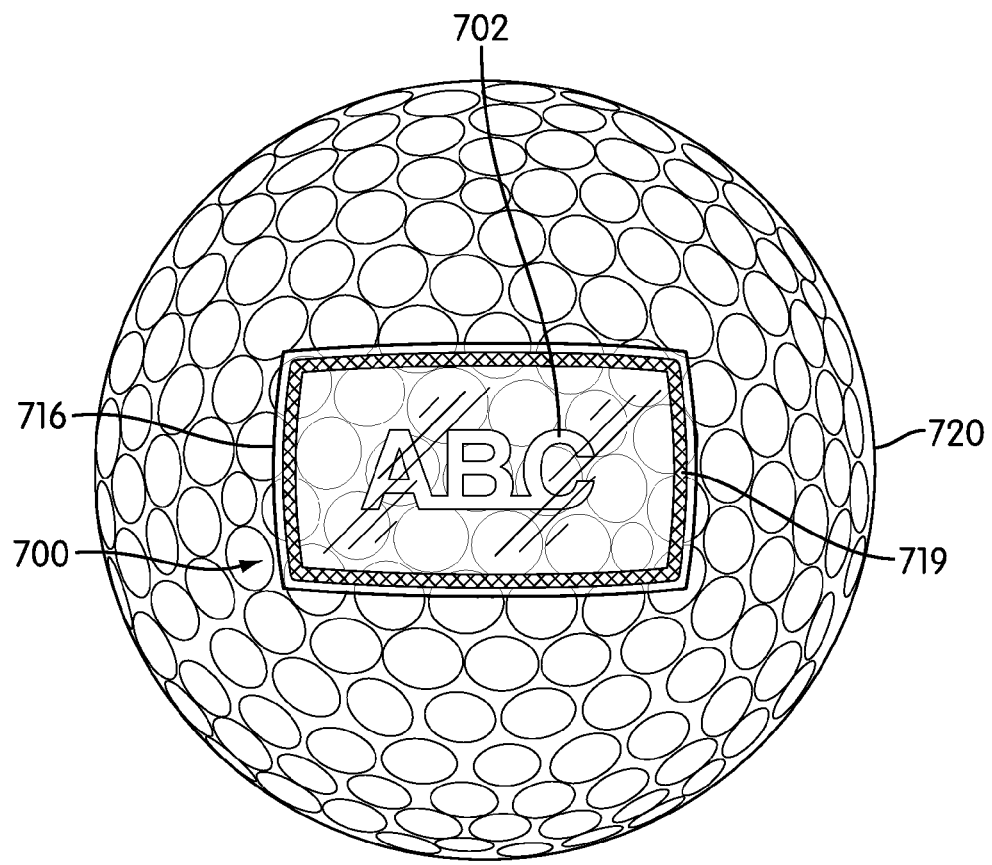
FIG. 7 is a schematic diagram of a perspective view of an exemplary embodiment of an application marking system having an adhesive layer that holds a dye pad against a surface of an article.

According to one embodiment, FIG. 7 illustrates a perspective view of an application marking system 700 having an adhesive layer 716 that holds a dye pad 702 against a surface of an article 720, which in this example is a golf ball. As shown in FIG. 7, adhesive layer 716 may be transparent so that the dye pad 702 and its positioning and condition may be viewed through the adhesive layer 716. The side of adhesive layer 716 facing article 720 may be entirely covered with an adhesive. Or, as shown in the example of FIG. 7, adhesive may be selectively applied to the side of adhesive layer 716 facing article 720. For example, adhesive may be applied in a strip 719 along the perimeter of the adhesive layer 716 as shown in FIG. 7. By adhering adhesive layer 716 to the surface of the article 720, the adhesive layer 716 may be pulled down around the dye pad to press the dye pad 702 firmly in contact with the surface of the article 720, without requiring a user to manually press the pad 702. The adhesive layer 716 may apply a constant force to the dye pad 702 to keep it pressed against the article 720 for a duration sufficiently long enough to enable the infusion dye to penetrate and mark the surface of the article 720.

Figure 8:
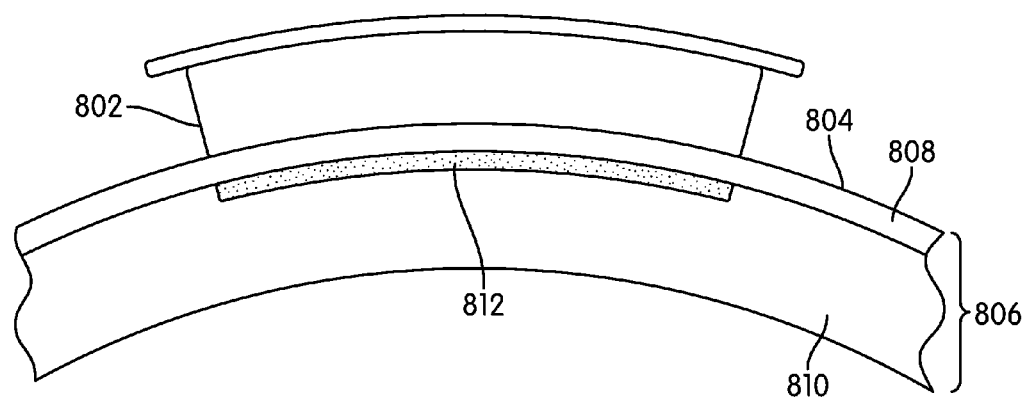
FIG. 8 is a schematic diagram of a cross-sectional view of an exemplary embodiment of a dye pad in contact with a surface of an article after the activated infusion dye has penetrated the surface and marked a substrate.

FIG. 8 illustrates a cross-sectional view of a dye pad 802 in contact with a surface 804 of an article 806 after the activated infusion dye has penetrated the surface 804 and marked a substrate. As shown, article 806 (which may be a golf ball, for example) has a first clear coating layer 808 and an underlying layer 810, which may be, for example, paint or an injection molded plastic. The infusion dye has created a marking 812 on and within the underlying layer 810. Since the marking 812 resides below the surface 804, the marking 812 is not easily rubbed off and is more durable than would be markings applied on top of the surface 804.

Figure 9:
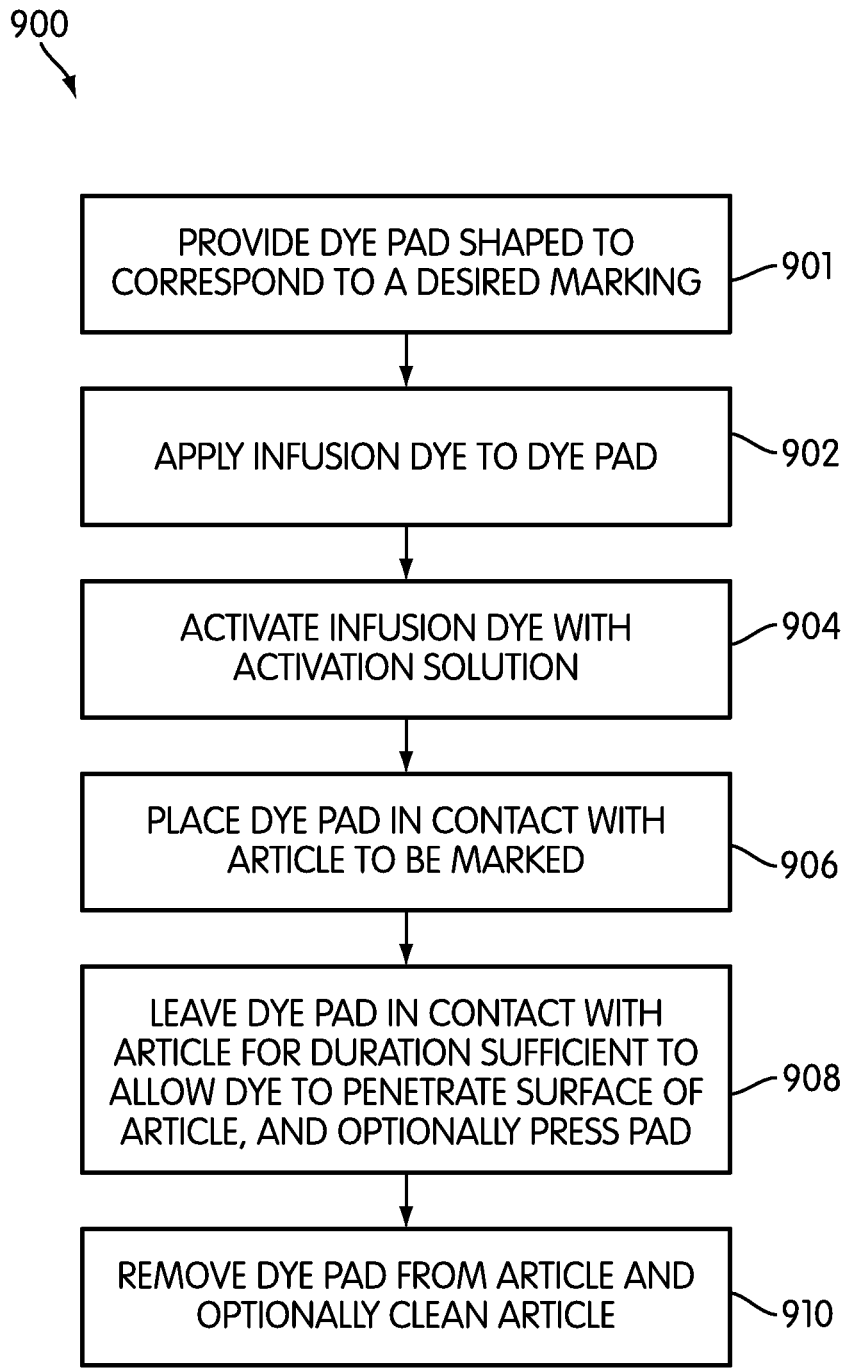
FIG. 9 is a flow chart illustrating an exemplary embodiment of a method for applying a marking to an article.

With the above application marking systems in mind, FIG. 9 illustrates a flow chart of an exemplary method 900 for applying a marking to an article. As shown, in step 901, the method begins by providing a dye pad shaped to correspond to a desired marking. The dye pad may be manufactured into a desired shape and provided to the user, or alternatively, may be formed into the desired shape by the user.

In step 902, an infusion dye may be applied to the dye pad. The infusion dye may comprise an aqueous solution and a surfactant. The dye pad may be manufactured with the infusion dye impregnated into the pad, or alternatively, an end user may apply the infusion dye to the dye pad during use.

In step 904, the infusion dye may be activated with an activation solution. The activation solution may be manufactured as part of the dye pad, for example, contained within the dye pad and separated from the infusion dye by a barrier, such as a capsule, a plurality of micro-capsules, or containment layers. In this case, the infusion dye may be activated by breaking the barrier to allow the activation solution to contact the infusion dye. The activation solution may also be dispersed throughout the dye pad with the infusion dye and activated by contact with air, in which case a cover may be removed from the dye pad to expose the dye pad to air. The activation solution may also be separately applied to the dye pad during use, for example, by spraying, brushing, or blotting the activation solution onto the pad. Activating the infusion dye may also comprise applying the activation solution to the dye pad first, and then applying the infusion dye.

In step 906, the dye pad may be placed in contact with an outer surface of the manufactured article. The dye pad may be placed in contact with the article before or after the infusion dye is activated. For example, in embodiments in which the dye and/or activation solution are applied to the dye pad after manufacture and are not contained within the dye pad, the dye and activation solution may be placed in contact with each other before placing the dye pad in contact with the article. In embodiments in which the dye and activation solution are contained within the manufactured dye pad, the dye pad may be placed onto the article first, after which the activation solution may be released to activate the infusion dye, for example, by pressing the dye pad against the article with a force sufficient to break a barrier (e.g., micro-capsules) in the dye pad that separates the infusion dye from the activation solution. Alternatively, a barrier separating the activation solution from the infusion dye could be broken first (e.g., by bending, folding, pressing, crushing, or twisting the dye pad), followed by placing the dye pad in contact with the surface of the article.

In step 908, the dye pad may be left in contact with the outer surface of the manufactured article under ordinary room conditions (e.g., room temperature and pressure), for a duration sufficient to allow the activated infusion dye to penetrate the outer surface. Optionally, during this time, a force may be applied against the dye pad to press the pad against the outer surface of the article to ensure even contact between the pad and outer surface and consistent transfer of infusion dye into the outer surface of the article. The force may be applied manually by the user or may be applied by a separate device, such as a mold, clamp, vise, or an adhesive layer that pulls down around the dye pad and adheres to the outer surface of the article, as described in an example above.

In step 910, the dye pad may be removed from the outer surface. Due to the infusion of the dye into the outer surface of the article, a marking is thereby left on the article. Optionally, the outer surface of the article may be wiped or otherwise cleaned to remove any excess infusion dye or activation solution. For example, the article may be rinsed with de-ionized water, and then dried.

Although FIG. 9 illustrates steps 901-910 in a particular order, other embodiments may accomplish the steps in different orders, as explained in some of the examples included above in the descriptions of the steps. As another example, the step 901 of providing a dye pad shaped to correspond to a desired marking may occur after infusion dye is applied to the dye pad. For instance, a dye pad impregnated with infusion dye may be provided to an end user, who then cuts the dye pad into a shape corresponding to a desired marking. In addition to different orders, the exemplary steps described above in reference to FIG. 9 may also occur substantially simultaneously. For example, if activation solution is first applied to a dye pad, followed by a dye, then the step 904 of activating the infusion dye may occur substantially simultaneously with the step 902 of applying infusion dye to the dye pad.

In addition, in other embodiments, the methods for applying a marking to an article may be repeated to apply multiple markings to the same article or to a plurality of different articles. For example, a marking application system may be reusable, such that the same marking application system is used to apply the same marking to a number of articles. In such a case, the dye pad may be configured to contain enough dye and activation solution to apply the markings to all of the articles, or may be configured to receive replenishments of the dye and activation solution as needed. In addition, different application marking systems may be used to apply different markings to the same article.

In embodiments, the dyes and activation solutions used in an application marking system may be suitable for infusion dye processing, and may be compatible with the materials from which the manufactured article to be marked is made. Preferably, the activation solutions interact with the dyes and the materials of the article to open the interstices between the molecules of the materials of the article to allow the dyes to penetrate and diffuse into the substrate. The activation solutions used for the infusion dyes may both dissolve the dyes and promote diffusion of dye molecules into the substrate of the article under mild conditions. The activation solutions may cause the substrate to swell providing an open polymeric structure, which allows fast diffusion of dye molecules into the substrate.

Non-limiting examples of suitable dyes and activation solutions, including solvents, are disclosed in U.S. Pat. No. 6,733,543; U.S. Publication No. 2007/0256255; U.S. Publication No. 2008/0098536 (which is assigned to the assignee of the present invention); and U.S. Publication No. 2009/0089942, all of which are herein incorporated by reference in their entirety. Other non-limiting examples of suitable dyes and activation solutions may also be drawn from the AURA technology of infusion coloring of plastic manufactured parts, which was developed by BAYER MATERIAL SCIENCE LLC of Pittsburgh, Pa.

In one implementation, infusion dye may be applied to a golf ball having a clear urethane outer coating, and an underlying layer of opaque urethane paint or an underlying colored injection molded plastic (e.g., colored with titanium dioxide). The activation solution may include water and/or another solvent (e.g., alcohol) that opens the polymeric structure of the clear coating and underlying layer to allow the dye to diffuse into the underlying layer. The infusion dye may be a water-soluble dye when the activation solution is water; for example, the dye may be a liquid dye such as an alkyleneoxy-substituted chromophore, as described in U.S. Pat. Nos. 4,284,729; 4,460,690; 4,732,570; and 4,812,141. The infusion dye may also be a dye that is soluble in solvents other than water, such as an organic solvent (e.g., alcohol). Suitable dyes may include static dyes, including disperse dyes (e.g., Disperse Blue #3, Disperse Blue #14, and Disperse Red #17); direct dyes (e.g., Solvent Blue 35, Solvent Green 3, and Acridine Orange Base); water-insoluble azo, diphenylamine, and anthraquinone compounds; acid dyes; and non-migratory static dyes (e.g., as disclosed in U.S. Pat. Nos. 4,284,729; 4,460,690; 4,732,570; and 4,812,141). In one embodiment, the dye and the activation solution, when mixed together, may comprise a mixture of dye, water, a carrier solvent, and a diol, for example, as described in U.S. Publication No. 2007/0256255.

In an embodiment, the dye or activation solution may also include a surfactant or emulsifier, which holds two or more immiscible liquids or solids in suspension (e.g., the dye and water). Suitable emulsifiers may include ionic, non-ionic, or mixtures thereof. In another embodiment, the dye or activation solution may also include performance-enhancing additives selected from at least one of UV stabilizers, optical brighteners, mold release agents, antistatic agents, thermal stabilizers, IR absorbers, and antimicrobial agents.

Based on the above systems and methods for applying markings to an article, further embodiments may include provisions for customizing a marking applied to an article according to an end user's desires and tastes. In one embodiment, a user may select a marking from a plurality of pre-designed markings, for example, presented in a printed catalog or displayed on an internet website. In another embodiment, a user may design his or her own marking, for example, by hand or by using personal design software, or by using software tools provided through an internet website. Through website tools, a user may arrange pre-designed characters, letters, pictures, or other images into a customized design for a marking. The website tools may also enable a user to upload custom designs, such as company logos, to incorporate into, or serve as, designs for markings.

Whether selected from pre-designed markings or custom-designed by a user, once the design is finalized, a dye pad may be manufactured according to the design. In one embodiment, the dye pad may be formed to match the design and may be provided to the user along with a separate dye and activation solution that are intended to be added to the pad by the user. In another embodiment, the dye and/or activation solution may be included in the custom-formed dye pad before it is provided to the user.

In one embodiment, in addition to receiving a user's selection of a pre-designed marking or a custom-designed marking, a manufacturer of the marking application system may also receive information from the user describing the article to which the marking is to be applied. In this manner, the manufacturer may tailor the dye pad to match the surface contours and features of the article to be marked. For example, in the case of a golf ball, a user may identify the manufacturer and model of the ball to be marked, which information the manufacturer of the marking application system may then use to design and produce a dye pad having projections that match the dimple pattern of the ball to be marked. A user may also specify the desired location and alignment of the marking so that the dye pad may be further customized to fit the particular location and alignment (e.g., along a specific portion of the ball or dimple pattern).

In receiving information about the article to be marked, a manufacturer of a marking application system may also design and provide a mold, clamp, vise, or other device for pressing a dye pad against the article to be marked. For example, in marking a ball, the user may specify the diameter of the ball, which the manufacture may then use to provide an appropriately sized and shaped mold into which the ball fits.

Overall, in some embodiments, a dye may locally penetrate, or infuse, into a plastic outer surface of a manufactured article, such as a golf ball. By using a dye pad discretely applied to only a portion of the outer surface of the article, marking application systems and methods may apply a marking without requiring immersion of the article in a dye bath. Infusing the dye may rely on a carrier solvent to infuse the dye into a plastic surface, which may be accomplished at ordinary room conditions, thereby avoiding the more complex sublimation printing processes that require considerable heat and pressure to achieve the vapor phase of sublimation ink to penetrate into a surface.

In one embodiment, an infusion dye pad may include a dye for a single color shaped to provide a design, such as a logo. A dye pad may also include a dye mixture having multiple colors that may form a more complex design "tattoo" when infused into a plastic portion of a golf ball or other article, and may include sub-pads for different colors or portions of the design. A design may be, for example, a mark, symbol, logo, or shape. The marking may have high durability due to penetration of the dye into the plastic. The dye in the pad may be activated by application of water, alcohol, or another carrier solvent, which may be incorporated into the pad or added separately to the patch.

In one embodiment, a method for applying the design to the golf ball may include pressing a dye pad onto an outer plastic portion of a golf ball, infusing a dye solution incorporated in the dye pad into the contact area, and providing a mirror image of a design on the outer surface of the golf ball at the pad-ball contact area. After a period that may range from a few seconds to a couple of minutes or more, the pad may be removed. The method may include post-manufacturing application of the dye patch to the golf ball by the consumer or others, such as golf pro shop personnel. The method may further include the consumer's creating a custom design that may be formed into a customized dye pad as a mirror image of their design.

The infusion dyeing technique enables the dye to penetrate into a plastic surface. The depth of color may be controlled by the length of time the article is in contact with the dye and activation solution. The color may not rub off since it is incorporated into the plastic itself. The infusion dyeing may therefore allow an economical custom marking of an article after the article has been molded or otherwise fabricated.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied and still remain within the spirit and scope of the present invention.

What is claimed is:

1. A method for marking a manufactured article with a desired marking, the method comprising:
   applying an infusion dye to a dye pad shaped to correspond to the desired marking,
       wherein the dye pad has a contact surface configured to contact a discrete area of an outer surface of the manufactured article,
       wherein the contact surface has one of a projection and a recess,
       wherein the discrete area of the outer surface of the manufactured article has the other of the projection and the recess, and
       wherein the projection and the recess are configured to mate with each other;
   applying an activation solution to the infusion dye, thereby forming an infusion dye mixture;
   placing the contact surface of the dye pad in contact with the discrete area of the outer surface of the manufactured article with the projection and the recess mated with each other;
   leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and
   removing the dye pad from the outer surface.

2. The method of claim 1, wherein the activation solution comprises one of water and alcohol.

3. The method of claim 1, wherein applying the activation solution to the infusion dye comprises:
   storing the activation solution in the dye pad separated from the infusion dye by a breakable barrier; and
   breaking the barrier.

4. The method of claim 3, wherein storing the activation solution comprises storing the activation solution in a breakable capsule.

5. A method for marking a manufactured article with a desired marking, the method comprising:
   applying an infusion dye to a dye pad shaped to correspond to the desired marking,
       wherein the dye pad has a contact surface configured to contact a discrete area of an outer surface of the manufactured article,
       wherein the contact surface has one of a projection and a recess,
       wherein the discrete area of the outer surface of the manufactured article has the other of the projection and the recess, and
       wherein the projection and the recess are configured to mate with each other;
   applying an activation solution to the infusion dye, thereby forming an infusion dye mixture;
   placing the contact surface of the dye pad in contact with the discrete area of the outer surface of the manufactured article with the projection and the recess mated with each other;
   leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and
   removing the dye pad from the outer surface,
   wherein applying the activation solution to the infusion dye comprises:
       storing the activation solution in the dye pad separated from the infusion dye by a breakable barrier, and
       breaking the barrier, and
       wherein storing the activation solution comprises containing the activation solution behind an impermeable breakable planar layer, with a dye-impregnated planar pad layer disposed on a side of the impermeable breakable planar layer opposite to the activation solution.

6. The method of claim 1, wherein the manufactured article comprises a golf ball.

7. The method of claim 1, wherein applying the activation solution to the infusion dye, placing the dye pad in contact with the outer surface, leaving the dye pad in contact with the outer surface, and removing the dye pad are completed at an end user location.

8. The method of claim 1, further comprising:
   reviewing a display of a plurality of selectable markings;
   selecting the desired marking from among the plurality of selectable markings; and
   receiving the dye pad shaped according to the desired marking.

9. The method of claim 1, further comprising:
   creating a custom marking to be the desired marking; and
   receiving the dye pad shaped according to the custom marking.

10. The method of claim 1, further comprising:
providing an identification of the article, from which surface features of the article are determined;
wherein the contact surface of the dye pad has complementary features that correspond to the surface features of the article.

11. The method of claim 10, wherein the article comprises a golf ball, wherein the identification comprises a manufacturer and a model associated with the golf ball, and wherein the surface features comprise a dimple pattern associated with the manufacturer and the model of the golf ball.

12. The method of claim 1, wherein the discrete area of the outer surface of the manufactured article has a plurality of recesses, wherein the contact surface of the dye pad has a plurality of projections each sized and shape to contact and align with a recess of the plurality of recesses, and wherein the method further comprises aligning the dye pad with the manufactured article by mating the projection with the recess.

13. The method of claim 1, wherein placing the contact surface of the dye pad in contact with the discrete area of the outer surface of the manufactured article comprises placing the manufactured article in a mold sized and shaped to receive the manufactured article and pressing the dye pad between the mold and the article.

14. The method of claim 1, wherein leaving the dye pad in contact with the outer surface comprises applying a force to the dye pad to press the dye pad against the outer surface.

15. A method for marking a manufactured article with a desired marking, the method comprising:
applying an infusion dye to a dye pad shaped to correspond to the desired marking,
wherein the dye pad has a contact surface configured to contact a discrete area of an outer surface of the manufactured article,
wherein the contact surface has one of a projection and a recess,
wherein the discrete area of the outer surface of the manufactured article has the other of the projection and the recess, and
wherein the projection and the recess are configured to mate with each other;
applying an activation solution to the infusion dye, thereby forming an infusion dye mixture;
placing the contact surface of the dye pad in contact with the discrete area of the outer surface of the manufactured article with the projection and the recess mated with each other;
leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and
removing the dye pad from the outer surface,
wherein applying the activation solution to the infusion dye comprises:
storing the activation solution in the dye pad separated from the infusion dye by a breakable barrier, and
breaking the barrier, and
wherein the dye pad comprises a sharp internal structure configured to puncture the breakable barrier when a force is applied to the dye pad, and wherein breaking the barrier comprises forcing the sharp internal structure against the breakable barrier.

16. A method for marking a manufactured article with a desired marking, the method comprising:
applying an infusion dye to a dye pad shaped to correspond to the desired marking,
wherein the dye pad has a contact surface configured to contact a discrete area of an outer surface of the manufactured article,
wherein the contact surface has one of a projection and a recess,
wherein the discrete area of the outer surface of the manufactured article has the other of the projection and the recess, and
wherein the projection and the recess are configured to mate with each other;
applying an activation solution to the infusion dye, thereby forming an infusion dye mixture;
placing the contact surface of the dye pad in contact with the discrete area of the outer surface of the manufactured article with the projection and the recess mated with each other;
leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and
removing the dye pad from the outer surface,
wherein before placing the contact surface of the dye pad in contact with the discrete area of the outer surface of the manufactured article, the method further comprises holding the dye pad by an impermeable backing on a first side of the dye pad and removing a removable cover on a second side of the dye pad opposite to the first side.

17. A method for marking a manufactured article with a desired marking, the method comprising:
applying an infusion dye to a dye pad shaped to correspond to the desired marking,
wherein the dye pad has a contact surface configured to contact a discrete area of an outer surface of the manufactured article,
wherein the contact surface has one of a projection and a recess,
wherein the discrete area of the outer surface of the manufactured article has the other of the projection and the recess, and
wherein the projection and the recess are configured to mate with each other;
applying an activation solution to the infusion dye, thereby forming an infusion dye mixture;
placing the contact surface of the dye pad in contact with the discrete area of the outer surface of the manufactured article with the projection and the recess mated with each other;
leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and
removing the dye gad from the outer surface,
wherein the dye pad comprises an outer surface opposite to the contact surface and an adhesive layer over the outer surface, wherein placing the contact surface of the dye pad in contact with the discrete area of the outer surface of the manufactured article comprises adhering the adhesive layer to the outer surface of the manufactured article with the dye pad pressed between the adhesive layer and the outer surface of the manufactured article.

18. A method for marking a manufactured article with a desired marking, the method comprising:
applying an infusion dye to a dye pad shaped to correspond to the desired marking,
   wherein the dye pad has a contact surface configured to contact a discrete area of an outer surface of the manufactured article,
   wherein the contact surface has one of a projection and a recess,
   wherein the discrete area of the outer surface of the manufactured article has the other of the projection and the recess, and
   wherein the projection and the recess are configured to mate with each other;
applying an activation solution to the infusion dye, thereby forming an infusion dye mixture;
placing the contact surface of the dye pad in contact with the discrete area of the outer surface of the manufactured article with the projection and the recess mated with each other;
leaving the dye pad in contact with the outer surface of the manufactured article under room temperature and pressure, for a duration sufficient to allow the infusion dye mixture to open a polymeric structure of a material of the outer surface and to allow the infusion dye to penetrate the outer surface and form the desired marking within a substrate of the article; and
removing the dye pad from the outer surface,
wherein the dye pad comprises a divider that separates a first portion of the dye pad from a second portion of the dye pad, wherein applying an infusion dye to the dye pad comprises applying a first dye to the first portion and a second dye to the second portion, wherein the divider avoids mixing of the first dye applied to the first portion and the second dye applied to the second portion.

19. The method of claim 1, wherein the contact surface of the dye pad is pre-marked with colors and designs, and wherein the method further comprises applying different color dyes to the contact surface as indicated by the pre-marked colors and designs.

20. The method of claim 1, wherein the manufactured article is a golf ball, wherein the discrete area of the outer surface of the golf ball has a plurality of dimples in a dimple pattern, and wherein the contact surface of the dye pad has a plurality of projections that correspond in size, shape, and position to the plurality of dimples and are configured to contact and align with the plurality of dimples.

21. The method of claim 20, wherein before applying the infusion dye to the dye pad, the method further comprises
providing an identification of the golf ball to a dye pad supplier, wherein the identification enables the dye pad supplier to determine the plurality of dimples in the dimple pattern and the corresponding plurality of projections, and
receiving the dye pad from the dye pad supplier.

22. The method of claim 21, wherein the identification comprises a manufacturer and a model of the golf ball, and wherein the plurality of dimples in the dimple pattern correspond to the manufacturer and the model of the golf ball.

23. A method for marking a golf ball with a desired marking, the method comprising:
applying an infusion dye to a dye pad shaped to correspond to the desired marking,
   wherein the dye pad has
      a dye pad contact surface configured to contact a discrete area of a golf ball outer surface of the golf ball, and
      a dye pad outer surface opposite to the dye pad contact surface,
   wherein the dye pad contact surface has one of a projection and a recess,
   wherein the discrete area of the golf ball outer surface has the other of the projection and the recess, and
   wherein the projection and the recess are configured to mate with each other;
applying an activation solution to the infusion dye, thereby forming an infusion dye mixture;
placing the dye pad contact surface in contact with the discrete area of the golf ball outer surface with the projection and the recess mated with each other;
adhering an adhesive layer to the golf ball outer surface with the dye pad pressed between the adhesive layer and the golf ball outer surface;
leaving the dye pad in contact with the golf ball outer surface under room temperature and under pressure by the adhesive layer, for a duration sufficient to allow the infusion dye mixture to open a polymeric structure of a material of the golf ball outer surface and to allow the infusion dye to penetrate the golf ball outer surface and form the desired marking within a substrate of the article; and
removing the dye pad from the golf ball outer surface.

24. The method of claim 23, wherein the adhesive layer is transparent and the method further comprises viewing positioning of the dye pad through the adhesive layer.

25. The method of claim 23, wherein adhering the adhesive layer comprises adhering a strip along a perimeter of the adhesive layer.

26. The method of claim 23, wherein adhering the adhesive layer comprises pulling the adhesive layer down around the dye pad to press the dye pad firmly in contact with the golf ball outer surface.

* * * * *